F. D. LADENBERGER.
HARROW ATTACHMENT FOR CULTIVATOR-PLOWS.

No. 171,391. Patented Dec. 21, 1875.

WITNESSES:

INVENTOR:
F. D. Ladenberger
BY
ATTORNEYS.

UNITED STATES PATENT OFFICE.

FREDERICK D. LADENBERGER, OF GLENBEULAH, WISCONSIN.

IMPROVEMENT IN HARROW ATTACHMENTS FOR CULTIVATOR-PLOWS.

Specification forming part of Letters Patent No. 171,391, dated December 21, 1875; application filed September 17, 1875.

*To all whom it may concern:*

Be it known that I, FREDERICK D. LADENBERGER, of Glenbeulah, Sheboygan county, Wisconsin, have invented a new and Improved Harrow Attachment to Cultivator-Plows, of which the following is a specification:

My invention consists in a combined implement, comprising a shovel or breaking plow, two side plows, and two harrows, the two latter being connected to the former by eyebolts and brace-rods, and made adjustable in width by means of a curved bar, as will be hereinafter more fully described.

Figure 1:
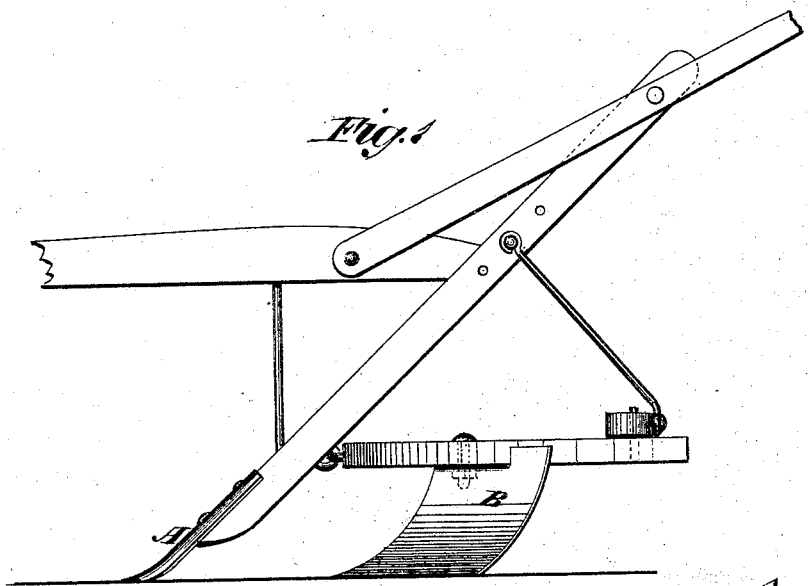
Figure 2:
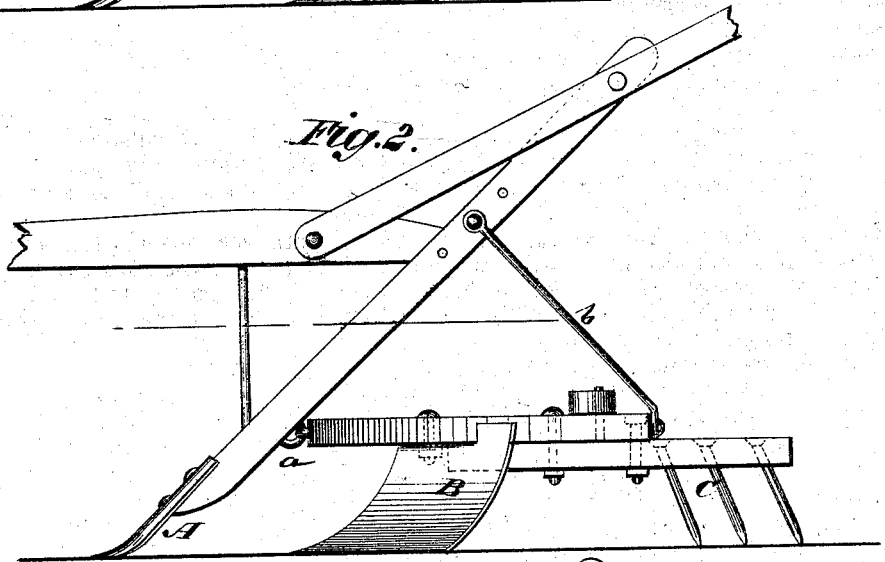
Figure 3:
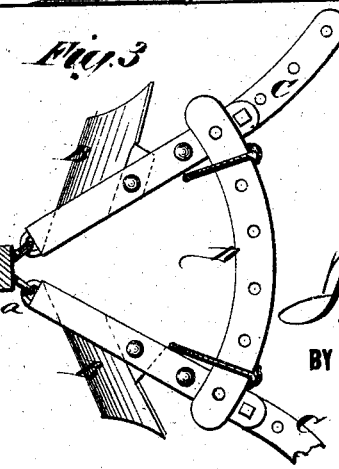

Figure 1 is a side elevation of the cultivator without the attachment. Fig. 2 is a side elevation of the cultivator and the attachment, and Fig. 3 is a plan view.

Similar letters of reference indicate corresponding parts.

A is the forward breaking-plow, and B the side plows, of a hilling-cultivator, to which I attach the harrows C in such manner as to run along behind the plows B, and to extend a little farther laterally than they do, the object being to have the harrows run a little closer to the rows than the plows, and rake and smooth down the furrow turned up by the plows; also, to rake out the grass and turf thrown up against the plants by the plows.

The beams of the harrows are bolted directly to the under side of the beams of the side plows, and both are connected to the standard of the breaking-plow by eyebolts $a$ and brace-rods $b$. D is a curved bar, provided at suitable intervals with holes and pins, whereby the width of the side plows and harrows can be adjusted to suit the work to be done.

In practice rods will run from the front end of the plow to the back end of the cultivators close to the ground, to lift all plants that are down, and allow the plows and harrow to pass under, and thus avoid covering them.

Having thus described my invention, I claim as new and desire to secure by Letters Patent—

A combined implement, consisting of the shovel or breaking plow A, side plows B, and harrows C, the beams of the plows B and C being rigidly bolted together and made adjustable in width by a curved bar, D, and connected to the breaking-plow A by means of eyebolts $a$ and brace-rods $b$, all constructed as and for the purpose specified.

FREDERICK D. LADENBERGER.

Witnesses:
J. H. LANDWEHR,
HENRY VOLQUARTS.